(12) United States Patent
Hodes et al.

(10) Patent No.: US 7,785,733 B2
(45) Date of Patent: Aug. 31, 2010

(54) RESERVE CELL-ARRAY NANOSTRUCTURED BATTERY

(75) Inventors: Marc Scott Hodes, Somerville, MA (US); Paul Robert Kolodner, Hoboken, NJ (US); Thomas Nikita Krupenkin, Middletown, WI (US); Alan Michael Lyons, New Providence, NJ (US); Mary Louise Mandich, Martinsville, NJ (US); Joseph Ashley Taylor, Madison, WI (US); Donald Weiss, Cresskill, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1205 days.

(21) Appl. No.: 10/803,565

(22) Filed: Mar. 18, 2004

(65) Prior Publication Data
US 2010/0183906 A1 Jul. 22, 2010

Related U.S. Application Data

(63) Continuation-in-part of application No. 10/716,084, filed on Nov. 18, 2003, now Pat. No. 7,227,235.

(51) Int. Cl.
*H01M 10/40* (2006.01)
(52) U.S. Cl. .................. 429/112; 429/62; 429/118; 977/948
(58) Field of Classification Search ............ None
See application file for complete search history.

(56) References Cited

U.S. PATENT DOCUMENTS

| 6,185,961 B1 | 2/2001 | Tonucci et al. .............. 65/60.4 |
| 2005/0106459 A1 * | 5/2005 | Kroupenkine et al. ....... 429/213 |

OTHER PUBLICATIONS

Kim, et al., "Nanostructured Surfaces for Dramatic Reduction of Flow Resistance in Droplet-Based Microfluidics," IEEE, pp. 479-482 (2002).

* cited by examiner

*Primary Examiner*—John S Maples
(74) *Attorney, Agent, or Firm*—Hitt Gaines, PC (57) ABSTRACT

A battery having an electrode with at least one nanostructured surface is disclosed wherein the nanostructured surface is divided into cells and is disposed in a way such that an electrolyte fluid of the battery is prevented from contacting the portion of electrode associated with each cell. When a voltage is passed over the nanostructured surface associated with a particular cell, the electrolyte fluid is caused to penetrate the nanostructured surface of that cell and to contact the electrode, thus activating the portion of the battery associated with that cell. The current/voltage generated by the battery is controlled by selectively activating only a portion of the cells. Multiple cells can be active simultaneously to produce the desired voltage. The more cells that are active, the higher the current/voltage and the lower the overall life of the battery. The life of the battery can be extended by activating fewer cells simultaneously.

7 Claims, 6 Drawing Sheets

RESERVE CELL-ARRAY NANOSTRUCTURED BATTERY

CROSS REFERENCE TO RELATED APPLICATIONS

This application is a continuation-in-part of U.S. Ser. No. 10/716,084, filed 18 Nov. 2003, now U.S. Pat. No. 7,227,235.

This application claims subject matter that is described in co-pending United States Patent Application filed simultaneously herewith and entitled "Nanostructured Battery Having End-Of-Life Cells," Ser. No. 10/803,576 filed on Mar. 18, 2004 and United States Patent Application filed simultaneously herewith and entitled "Reversibly-Activated Nanostructured Battery," Ser. No. 10/803,641 filed on Mar. 18, 2004.

FIELD OF THE INVENTION

The present invention relates generally to batteries and, more particularly, to batteries having nanostructured surfaces.

BACKGROUND OF THE INVENTION

Figure 1:
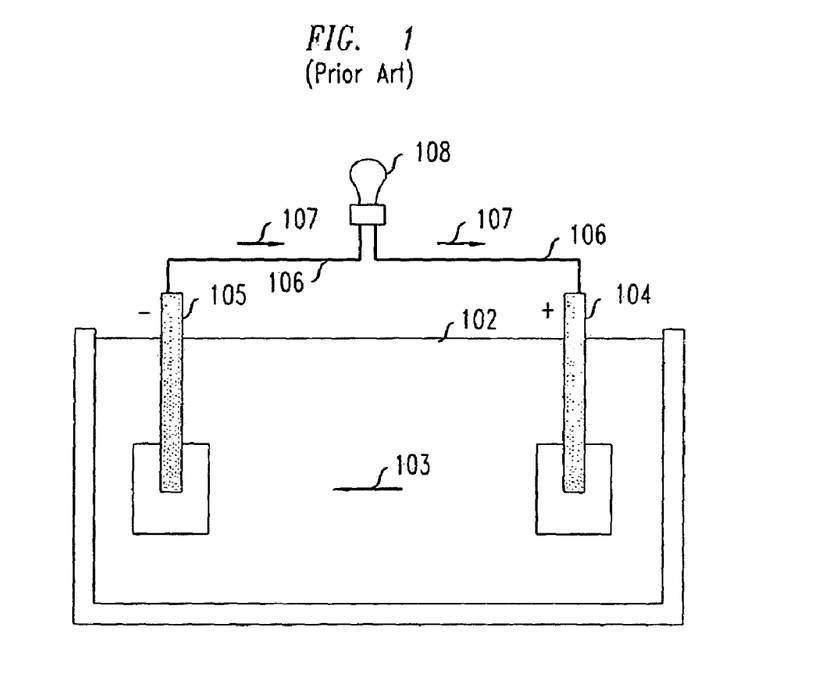
FIG. 1 shows a prior art liquid-cell battery as used in an electrical circuit.

Many beneficial devices or structures in myriad applications rely on batteries as a power source. A typical liquid-cell battery, such as battery 101 in FIG. 1, is characterized by an electrolyte liquid 102 which provides a mechanism for an electrical charge to flow in direction 103 between a positive electrode 104 and a negative electrode 105. When such a battery 101 is inserted into an electrical circuit 106 with illustrative load 108, it completes a loop which allows electrons to flow in direction 107 around the circuit 106. The positive electrode thus receives electrons from the external circuit 106. These electrons then react with the materials of the positive electrode 104 in reduction reactions that generate the flow of a charge to the negative electrode 105 via ions in the electrolyte liquid 102. At the negative electrode 105, oxidation reactions between the materials of the negative electrode 104 and the charge flowing through the electrolyte fluid 102 result in surplus electrons that are released to the external circuit 106.

As the above process continues, the active materials of the positive and negative electrodes 104 and 105, respectively, eventually become depleted and the reactions slow down until the battery is no longer capable of supplying electrons. At this point the battery is discharged. It is well known that, even when a liquid-cell battery is not inserted into an electrical circuit, there is often a low-level reaction with the electrodes 104 and 105 that can eventually deplete the material of the electrodes. Thus, a battery can become depleted over a period of time even when it is not in active use in an electrical circuit. This period of time will vary depending on the electrolyte fluid used and the materials of the electrodes.

More recently, batteries having at least one nanostructured surface have been proposed wherein nanostructures are used to separate the electrolyte from the electrode until such a time that the battery is to be used. An example of the use of electrowetting principles applied to batteries is described in copending U.S. patent application Ser. No. 10/716,084 filed Nov. 18, 2003 and entitled "Electrowetting Battery Having Nanostructured Surface," which is hereby incorporated by reference herein in its entirety. As disclosed in the '084 application, when it is desired that the battery generate a charge, the electrolyte is caused to penetrate the nanostructured surface and to come into contact with the electrode of the battery, thus resulting in the above-discussed flow of electrons around a circuit. Such a penetration of nanostructures is achieved, for example, by applying a voltage to the nanostructures such that the contact angle of the electrolyte relative to the nanostructured surface is decreased. When the contact angle is decreased, the electrolyte penetrates the nanostructures and is brought into contact with the electrode.

SUMMARY OF THE INVENTION

The present inventors have realized that it would be advantageous to be able to selectively control the voltage and/or current of a battery and to variably control the operational life of such a battery.

Therefore, the present inventors have invented a battery having an electrode with at least one nanostructured surface. The nanostructured surface is divided into cells and is disposed in a way such that an electrolyte fluid of the battery is prevented from contacting the portion of electrode associated with each cell. When a voltage is applied to the nanostructured surface associated with a particular cell, the electrolyte fluid is caused to penetrate the nanostructured surface of that cell and to contact the electrode, thus activating the portion of the battery associated with that cell. Thus, when the activated battery is inserted into an electrical circuit, electrons will flow along the circuit.

The voltage generated by the battery is controlled by selectively activating only a portion of the cells. Multiple cells can be active simultaneously to produce the desired voltage and/or current. The more cells that are active, the higher the voltage and/or current and the lower the overall life of the battery. The life of the battery can be extended by activating fewer cells simultaneously.

DETAILED DESCRIPTION

Figure 2:
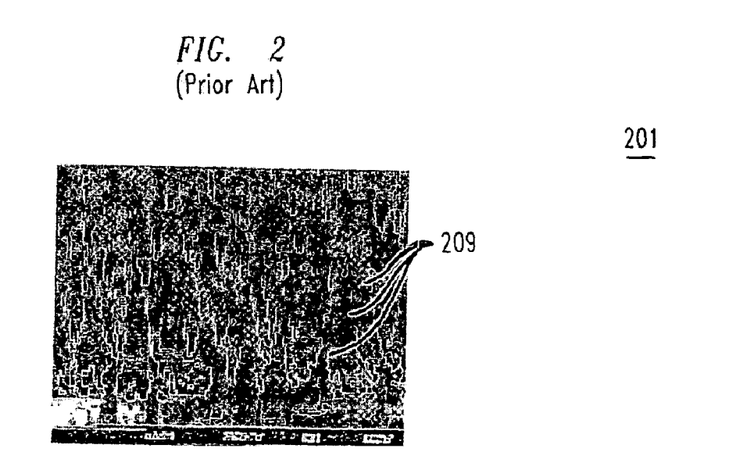
FIG. 2 shows a prior art nanopost surface.

FIG. 2 shows an illustrative nanopost pattern 201 with each nanopost 209 having a diameter of less than 1 micrometer. While FIG. 2 shows nanoposts 209 formed in a somewhat conical shape, other shapes and sizes are also achievable. In fact, cylindrical nanopost arrays have been produced with each nanopost having a diameter of less than 10 nm. Specifically, FIGS. 3A-3E show different illustrative arrangements of nanoposts produced using various methods and further show that such various diameter nanoposts can be fashioned with different degrees of regularity. Moreover, these figures show that it is possible to produce nanoposts having various diameters separated by various distances. An illustrative method of producing nanoposts, found in U.S. Pat. No. 6,185,961, titled "Nanopost arrays and process for making same," issued Feb. 13, 2001 to Tonucci, et al, is hereby incorporated by reference herein in its entirety. Nanoposts, as well as other shapes of nanostructures, have been manufactured by various methods, such as by using a template to form the posts, by various means of lithography, and by various methods of etching.

Figure 3A:
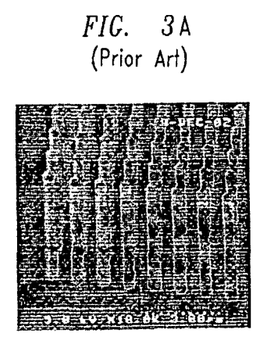
FIGS. 3A, 3B, 3C, 3D and 3E show various prior art nanostructure feature patterns of predefined nanostructures that are suitable for use in the present invention.
Figure 3B:
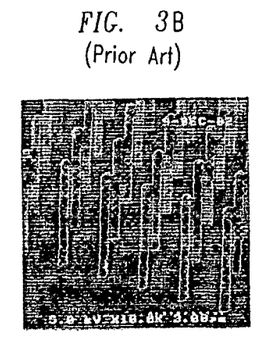
Figure 3C:
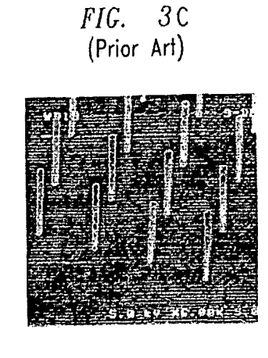
Figure 3D:
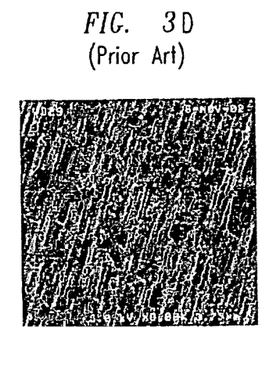
Figure 3E:
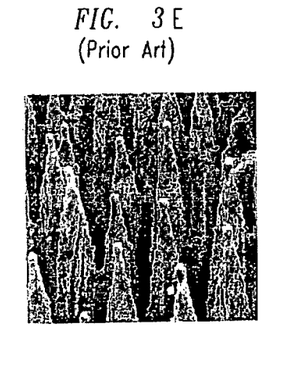
Figure 4:
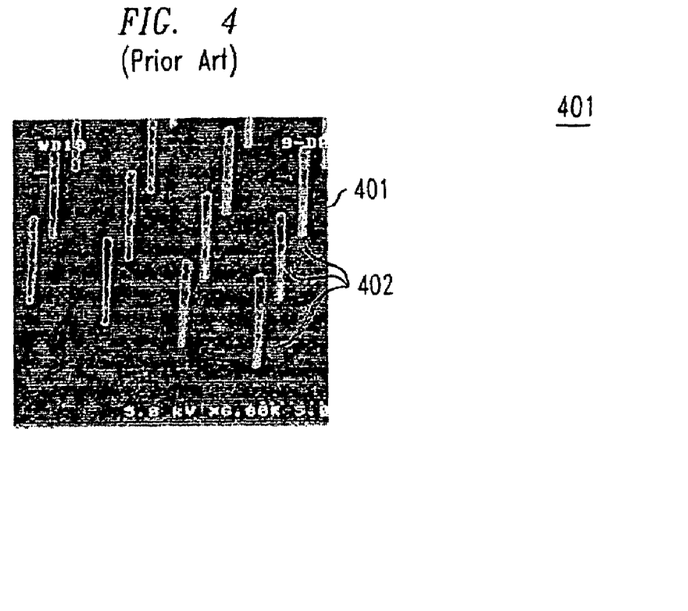
FIG. 4 shows a more detailed view of the prior art nanostructure feature pattern of FIG. 3C.

FIG. 4 shows the illustrative known surface 401 of FIG. 3C with a nanostructure feature pattern of nanoposts 402 disposed on a substrate. Throughout the description herein, one skilled in the art will recognize that the same principles applied to the use of nanoposts or nanostructures can be equally applied to microposts or other larger features in a feature pattern. The surface 401 and the nanoposts 402 of FIG. 4 are, illustratively, made from silicon. The nanoposts 402 of FIG. 4 are illustratively approximately 350 nm in diameter, approximately 6 µm high and are spaced approximately 4 µm apart, center to center. It will be obvious to one skilled in the art that such arrays may be produced with regular spacing or, alternatively, with irregular spacing.

As typically defined a "nanostructure" is a predefined structure having at least one dimension of less than one micrometer and a "microstructure" is a predefined structure having at least one dimension of less than one millimeter. However, although the disclosed embodiments refer to nanostructures and nanostructured surfaces, it is intended by the present inventors, and will be clear to those skilled in the art, that microstructures may be substituted in many cases. Accordingly, the present inventors hereby define nanostructures to include both structures that have at least one dimension of less than one micrometer as well as those structures having at least one dimension less than one millimeter. The term "feature pattern" refers to either a pattern of microstructures or a pattern of nanostructures. Further, the terms "liquid," "droplet," and "liquid droplet" are used herein interchangeably. Each of those terms refers to a liquid or a portion of liquid, whether in droplet form or not.

Figure 5A:
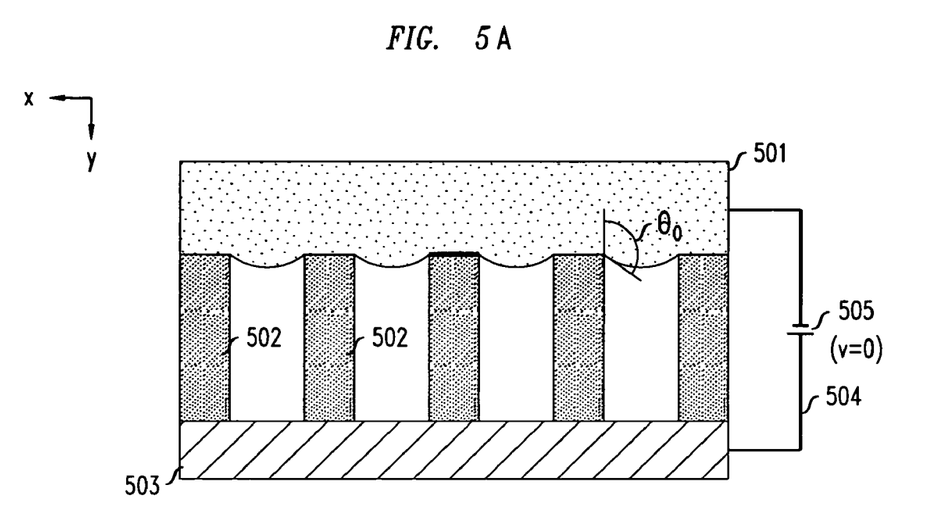
FIGS. 5A and 5B show a device in accordance with the principles of the present invention whereby electrowetting principles are used to cause a liquid droplet to penetrate a nanostructure feature pattern.
Figure 5B:
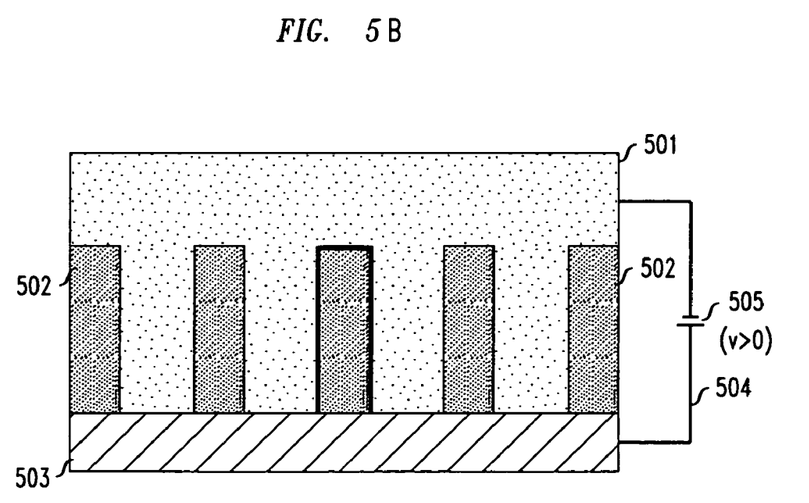
Figure 6:
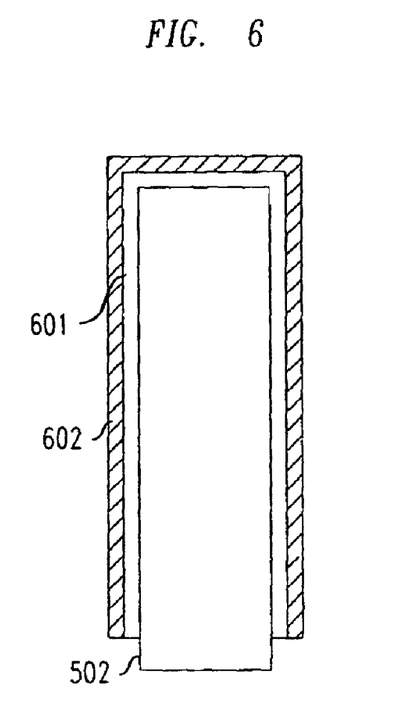
FIG. 6 shows the detail of an illustrative nanopost of the nanostructure feature pattern of FIGS. 5A and 5B.

The present inventors have recognized that it is desirable to be able to control the penetration of a given liquid into a given nanostructured or microstructured surface and, thus, control the contact of the liquid with the underlying substrate supporting the nanostructures or microstructures. FIGS. 5A and 5B show one embodiment where electrowetting is used to control the penetration of a liquid into a nanostructured surface. Electrowetting principles and controlling the movement of a liquid across a nanostructured or microstructured surface are generally described in U.S. patent application Ser. No. 10/403,159 filed Mar. 31, 2003 and titled "Method And Apparatus For Variably Controlling The Movement Of A Liquid On A Nanostructured Surface," which is hereby incorporated by reference herein in its entirety. As discussed previously, the general use of electrowetting principles in batteries is described in above-referenced copending U.S. patent application Ser. No. 10/716,084. One skilled in the art will recognize that a variety of shapes of structures, such as microline structures, are equally useful in accordance with the principles of the present invention and, indeed, may be preferably used in place of nanoposts. Microlines and other suitable structures are more fully discussed in the '159 application referenced herein above. Referring to FIG. 5A, a droplet 501 of conducting liquid (such as an electrolyte solution in a liquid-cell battery) is disposed on nanostructure feature pattern of cylindrical nanoposts 502, as described above, such that the surface tension of the droplet 501 results in the droplet being suspended on the upper portion of the nanoposts 502. In this arrangement, the droplet only covers surface area $f_1$ of each nanopost. The nanoposts 502 are supported by the surface of a conducting substrate 503. Droplet 501 is illustratively electrically connected to substrate 503 via lead 504 having voltage source 505. An illustrative nanopost is shown in greater detail in FIG. 6. In that figure, nanopost 502 is electrically insulated from the liquid (501 in FIG. 5A) by material 601, such as an insulating layer of dielectric material. The nanopost is further separated from the liquid by a low surface energy material 602, such as a well-known fluoropolymer. Such a low surface energy material allows one to obtain an appropriate initial contact angle between the liquid and the surface of the nanopost. It will be obvious to one skilled in the art that, instead of using two separate layers of different material, a single layer of material that possesses sufficiently low surface energy and sufficiently high insulating properties could be used.

FIG. 5B shows that, by applying a low voltage (e.g., 10-20 volts) to the conducting droplet of liquid 501, a voltage difference results between the liquid 501 and the nanoposts 502. The contact angle between the liquid and the surface of the nanopost decreases and, at a sufficiently low contact angle, the droplet 501 moves down in the y-direction along the surface of the nanoposts 502 and penetrates the nanostructure feature pattern until it complete surrounds each of the nanoposts 502 and Comes into contact with the upper surface of substrate 503. In this configuration, the droplet covers surface area $f_2$ of each nanopost. Since $f_2 >> f_1$, the overall contact area between the droplet 501 and the nanoposts 502 is relatively high such that the droplet 501 contacts the substrate 503. One skilled in the art will recognize that other methods of causing the electrolyte to penetrate the nanostructures, such as decreasing the temperature of the electrodes, can be used. The present invention is intended to encompass any such method of causing such penetration.

Figure 7:
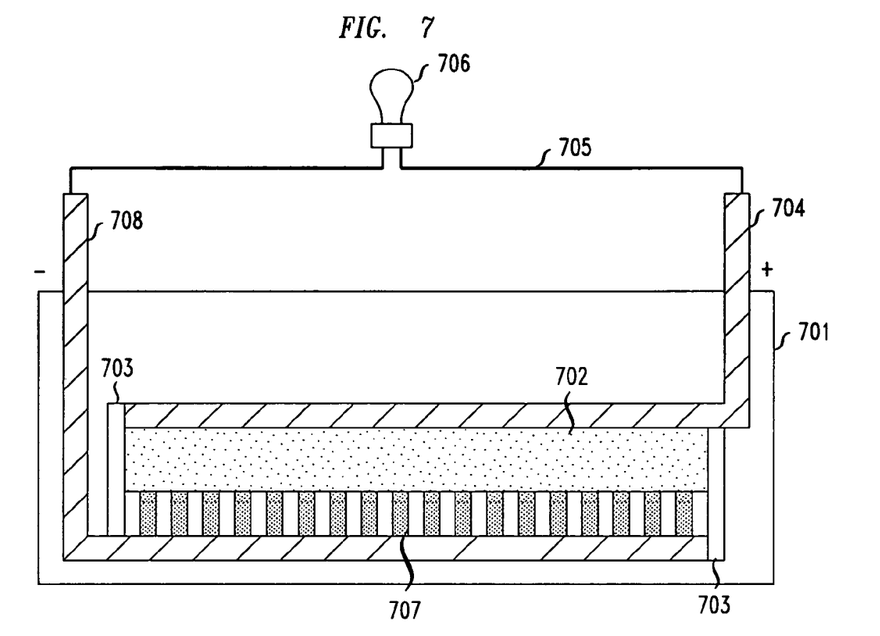
FIG. 7 shows an illustrative liquid-cell battery in accordance with the principles of the present invention wherein the electrolyte in the battery is separated from the negative electrode by nanostructures.

FIG. 7 shows an illustrative battery 701 whereby an electrolyte fluid 702 is contained within a housing having containment walls 703. The electrolyte fluid 702 is in contact with positive electrode 704, but is separated from negative electrode 708 by nanostructured surface 707. Nanostructured surface 707 may be the surface of the negative electrode or, alternatively, may be a surface bonded to the negative electrode. One skilled in the art will recognize that the nanostructured surface could also be used in association with the positive electrode with similarly advantageous results. In FIG. 7, the electrolyte fluid is suspended on the tops of the nanoposts of the surface, similar to the droplet of FIG. 5A. The battery 701 is inserted, for example, into electrical circuit 705 having load 706. When the electrolyte liquid is not in contact with the negative electrode, there is substantially no reaction between the electrolyte and the electrodes 704 and 705 of the battery 701 and, therefore, there is no depletion of the materials of the electrodes. Thus, it is possible to store the battery 701 for relatively long periods of time without the battery becoming discharged.

Figure 8:
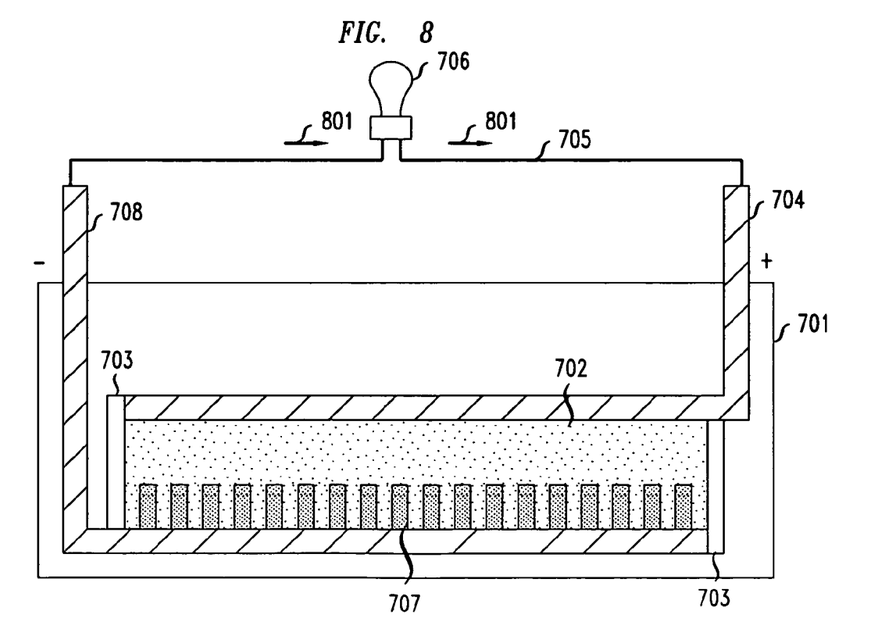
FIG. 8 shows the illustrative battery of FIG. 7 wherein the electrolyte in the battery is caused to penetrate the nanostructures and to thus contact the negative electrode.

FIG. 8 shows the battery 701 of FIG. 7 inserted into electrical circuit 705 wherein, utilizing the electrowetting principles described above, a voltage is applied to the nanostructured surface 707, thus causing the electrolyte fluid 702 to penetrate the surface 707 and to come into contact with the negative electrode 708. One skilled in the art will recognize that this voltage can be generated from any number of sources such as, for example, by passing one or more pulses of RF energy through the battery. When the penetration of the electrolyte into the nanostructures occurs, electrons begin flowing in direction 801 through the circuit 705, as described above, and the load 706 is powered. Thus, the embodiment of FIGS. 7 and 8 show how a battery can be stored without depletion for a relatively long period of time and can then be "turned on" at a desired point in time to power one or more electrical loads in an electrical circuit.

Figure 9:
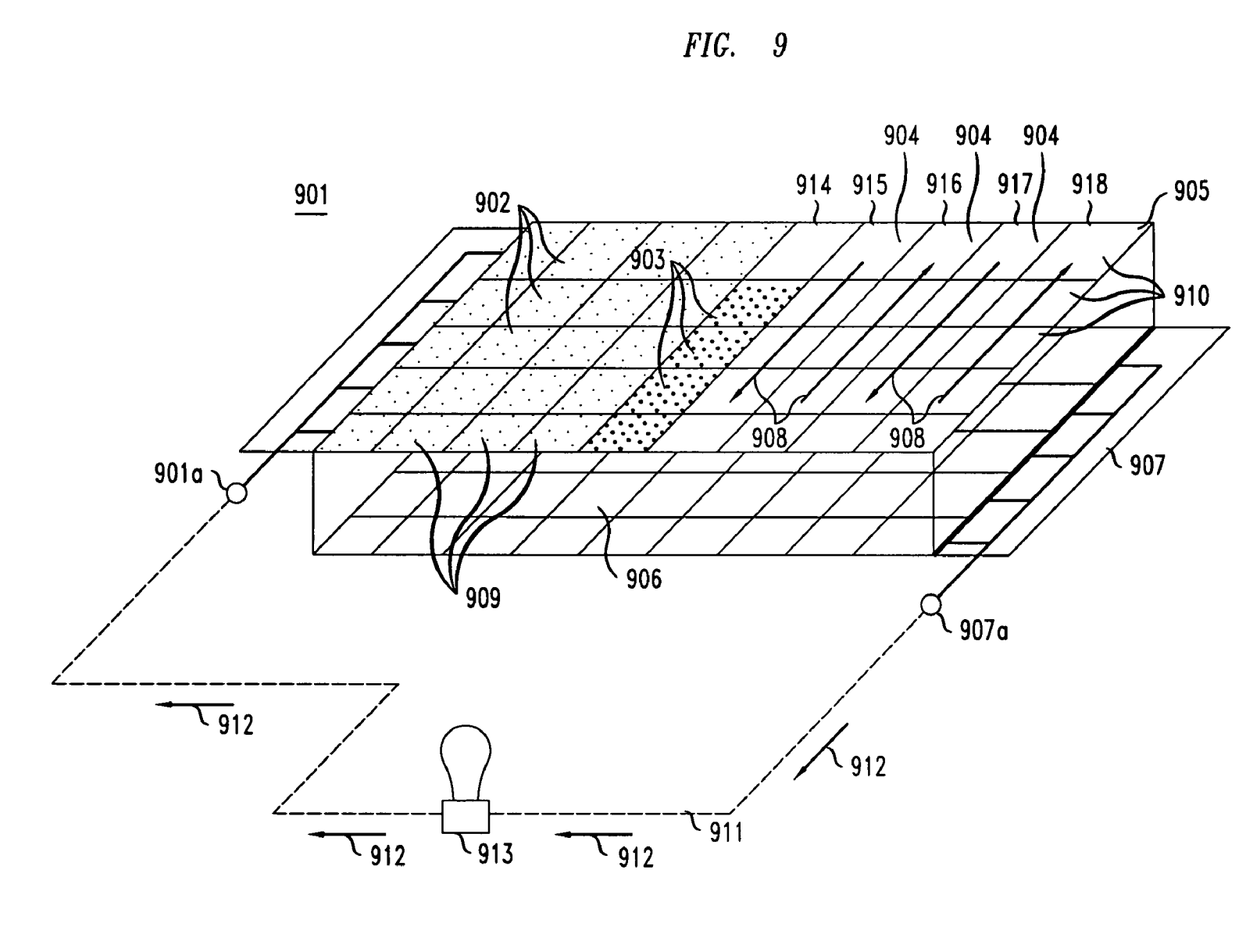
FIG. 9 shows an illustrative array of cells useful in accordance with the principles of the present invention.

FIG. 9 shows one illustrative embodiment of a novel battery, such as a lithium-ion or lead-acid battery, in accordance with the principles of present invention. In FIG. 9, battery 900 has positive electrode 901 and negative electrode 907 which are, illustratively, parallel plate electrodes. Leads 901a and 907a are, for example, electrically conductive leads useful for connecting the battery to an electrical load. Electrolyte 906, which is any one of well-known electrolytes suitable for use in battery 900, is contained within a cavity separating electrodes 901 and 907. Each of the electrodes 901 and 907 has at least one surface that is exposed to the electrolyte in a way such that, when active, an electrical current is generated by the battery, due to the reactions between the electrolyte and electrodes, as described previously. The portion of the surface of electrode 901 that is exposed to the electrolyte is illustratively a nanostructured surface, similar to the nanostructured electrode 707 in FIG. 7. One skilled in the art will recognize that portions of both electrode 901 and electrode 907 may be nanostructured similar to electrode 707.

The illustrative battery 900 of FIG. 9 functions in similar fashion to the battery 701 of FIG. 7. However, the present inventors have recognized that it would be desirable to have greater control over the current and/or voltage produced by the battery, as well as better control over the life of the battery. Therefore, in order to achieve this control, nanostructured electrode 901 the present inventors have divided the electrode into an array of cells, or pixels. The array of cells is arranged in columns and rows, such as, illustratively, columns 909 of cells and rows 910 of cells. By allowing the electrolyte to penetrate only one or more particular cells in the array, for example by only applying a low voltage to the nanostructures in those cells, the current/voltage produced by the battery 900 can be selected at a particular desired level depending on the application.

In one potential embodiment of a selective and variable current application, battery 900 of FIG. 9 is inserted into an illustrative electrical circuit 911 having illustrative electrical load 913. In this illustrative example, four cells 903 on the positive electrode are currently active or, in other words, are producing a flow of ions from the positive electrode 901 to the negative electrode 907 and thus producing an electrical current flowing in direction 912 over the electrical circuit from lead 907a to lead 901a. Power is thus provided to load 913. One skilled in the art will recognize that, by using fewer cells, a reduced flow of ions between electrodes 901 and 907 result, thus reducing the current produced by the battery 900. In this case, however, the theoretical life of the battery will be longer since a smaller area of electrode 901 is in contact with the electrolyte in a given amount of time. On the other hand, it is possible to activate all cells in the array at one time, which provides the theoretical potential of producing a relatively high instantaneous current. However, one skilled in the art will recognize that battery life will be greatly reduced since the entire surface area of the electrode corresponding to all the activated cells will be depleted more quickly.

The foregoing embodiment describes a battery where the current generated by the battery is capable of being varied. One skilled in the art will recognize that this is possible when the electrolyte is disposed in an open chamber between the electrodes in a way such that the electrolyte is common among all the cells. The plurality of cells formed on the electrode(s) are electrically connected in parallel and, therefore, the current of the battery can be varied by activating one or more cells. The more cells that are activated, the greater the current generated by the battery.

The present inventors have realized that, in addition to variably controlling the current produced by the battery, it may be desirable to also variably control the voltage of a battery. One skilled in the art will recognize that varying the number of cells connected in series could achieve such a variable control of voltage. Thus, in order to achieve such a series connection, the present inventors have invented a battery wherein, instead of disposing the electrolyte in an open chamber, the area below each cell between electrodes 901 and 907 is separated from the other cells. Thus, multiple individually electrically isolated compartments are associated with each of the cells on electrode 901 so that, when the number of activated cells is varied, the voltage of the battery is correspondingly varied. Accordingly, in this case, activating more cells leads to a higher voltage produced by the battery. One skilled in the art will fully appreciate that, by implementing the appropriate standard electronic circuitry in, for example, the battery control circuit, the battery can be dynamically switched between a series and a parallel connection, thus selectively permitting variable control of the circuit or the voltage of the battery. In many applications, it may be desirable to activate only a portion of cells, such as cells 903, in normal operations and then, in cases where emergency power is require or when any other unusual demand is realized, to active additional cells as needed. In normal operations, the current/voltage supplied to the circuit can be maintained by progressively activating new cells when old cells become depleted. For example, cells 902 represent those cells that have already been depleted and, as discussed, cells 903 represent those cells that are currently active. Cells 904 represent those cells that have not been activated. In this illustrative example, one possible progression of cells is that, as the individual cells in column 914 are depleted, cells in column 915 are progressively activated in direction 908, followed by activation of the cells in column 916, followed by column 917 and then column 918 until the final cell 905 is activated. One skilled in the art will recognize that many paths or selection methods for selecting cells to be activated may be used to achieve a desired voltage/current level and/or battery life, including random activation. The principles of the present invention are contemplated to include any and all such methods. One skilled in the art will also recognize that, in addition to dividing electrode 901 into cells, electrode 907 could likewise be divided into cells. If those divided cells of electrode 907 are nanostructured as discussed above, one or more cells in electrode 907 may be selectively activated at the same time a corresponding cell on electrode 901 is activated, thus providing a discrete flow of ions between one particular cell on electrode 901 and one particular cell on electrode 907. Alternatively, the electrolyte may be permitted to contact the entire area of one of electrodes 901 and 907, but may only be permitted to contact selected activated cells on the other electrode. One skilled in the art will recognize, in light of the teachings herein, that many such arrangements are possible and that such arrangements are fully contemplated by the principles of the present invention.

The foregoing merely illustrates the principles of the invention. It will thus be appreciated that those skilled in the art will be able to devise various arrangements which, although not explicitly described or shown herein, embody the principles of the invention and are within its spirit and scope. For example, one skilled in the art, in light of the descriptions of the various embodiments herein, will recognize that the principles of the present invention may be utilized in widely disparate fields and applications. For example, while the embodiment disclosed herein is a battery having nanostructured surfaces, one skilled in the art will appreciate that such nanostructured surfaces may be used for other uses, such as in use as a thermostat. In such a case, the characteristics of the pattern of nanostructures and the liquid in contact with the nanostructures can be chosen in a way such that, upon a temperature increase of known amount, the liquid will penetrate the surface, thus achieving a desired result. One skilled in the art will be able to devise many similar uses of the underlying principles associated with the present invention, all of which are intended to be encompassed herein. All examples and conditional language recited herein are intended expressly to be only for pedagogical purposes to aid the reader in understanding the principles of the invention and are to be construed as being without limitation to such specifically recited examples and conditions. Moreover, all statements herein reciting aspects and embodiments of the invention, as well as specific examples thereof, are intended to encompass functional equivalents thereof.

What is claimed is:

1. An apparatus comprising:
   a first electrode having a plurality of separate cells;
   an electrolyte fluid;
   a nanostructured surface corresponding to at least one of said cells in said plurality of separate cells,
   wherein said nanostructured surface is disposed between a portion of said electrode in said at least one of said cells and said electrolyte fluid in a way such that said nanostructured surface prevents contact of the electrolyte fluid and said portion of said electrode.

2. The apparatus of claim 1 further comprising:
   means for causing said electrolyte fluid to penetrate at least a portion of said nanostructured surface corresponding to at least one of said cells in said plurality of separate cells in a way such that said electrolyte contacts said electrode.

3. The apparatus of claim 2 wherein said means for causing comprises means for generating a voltage across said at least a portion of said nanostructured surface.

4. The apparatus of claim 2 wherein said means for causing comprises means for increasing the temperature of said nanostructured surface.

5. The apparatus of claim 2 wherein said at least one of said cells comprises those cells whereby, upon permitting said electrolyte to penetrate the nanostructures corresponding to said cells, a predetermined voltage is generated by said apparatus.

6. The apparatus of claim 1 further comprising:
   a voltage generator for applying a voltage to at least a portion of said nanostructured surface in a way such that the angle of contact of said electrolyte with at least a portion of the nanostructures on said nanostructured surface changes.

7. A battery comprising:
   a plurality of electrodes;
   a plurality of nanostructures disposed on a surface of at least one of said electrodes, said surface divided into a plurality of separate cells,
   wherein said electrodes are disposed between an electrolyte fluid and that portion of said surface corresponding to each of said plurality of separate cells; and
   means for applying a voltage to said nanostructures, said voltage operative to decrease the angle of contact between said electrolyte and said nanostructures, thereby causing said electrolyte fluid to penetrate said nanostructures and contact said surface.

* * * * *